US011388566B2

(12) United States Patent
Takeyama et al.

(10) Patent No.: US 11,388,566 B2
(45) Date of Patent: Jul. 12, 2022

(54) COMMUNICATION DEVICE, ABNORMALITY DETERMINATION DEVICE, METHOD, AND STORAGE MEDIUM

(71) Applicant: TOYOTA JIDOSHA KABUSHIKI KAISHA, Toyota (JP)

(72) Inventors: Yoshinari Takeyama, Okazaki (JP); Shinichi Iiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 17/074,702

(22) Filed: Oct. 20, 2020

(65) Prior Publication Data

US 2021/0136541 A1 May 6, 2021

(30) Foreign Application Priority Data

Oct. 31, 2019 (JP) .............................. JP2019-199374

(51) Int. Cl.
*G06F 15/173* (2006.01)
*H04W 4/40* (2018.01)
*H04L 43/08* (2022.01)

(52) U.S. Cl.
CPC .............. *H04W 4/40* (2018.02); *H04L 43/08* (2013.01)

(58) Field of Classification Search
CPC ...... H04W 4/40; H04L 43/08; H04L 63/1416; H04L 2209/84; H04L 12/40; H04L 63/1466
USPC ......................................................... 709/224
See application file for complete search history.

(56) References Cited

U.S. PATENT DOCUMENTS

| 9,794,286 | B2 * | 10/2017 | Otsuka ................ H04L 63/1416 |
| 10,931,634 | B2 * | 2/2021 | Maeda ................ H04L 63/0209 |
| 2015/0314779 | A1 | 11/2015 | Nagakura et al. |
| 2015/0358351 | A1 | 12/2015 | Otsuka et al. |
| 2016/0284212 | A1 * | 9/2016 | Tatourian ......... G08G 1/096725 |
| 2016/0359893 | A1 * | 12/2016 | Kishikawa ............ H04L 67/12 |
| 2017/0032671 | A1 * | 2/2017 | Toyama ................ G08G 1/205 |
| 2018/0115575 | A1 * | 4/2018 | Hartkopp ............ H04L 63/1425 |
| 2018/0295147 | A1 * | 10/2018 | Haga .................... G07C 5/0808 |

(Continued)

FOREIGN PATENT DOCUMENTS

JP    2014-146868 A    8/2014

*Primary Examiner* — Umar Cheema
*Assistant Examiner* — Tesfu N Mekonen
(74) *Attorney, Agent, or Firm* — Oliff PLC

(57) ABSTRACT

A communication device includes: a first judging section that performs, on received data, a communication abnormality determination based on detection rules; and a setting section that compares a category of data, which the first judging section has determined to represent a communication abnormality during a current trip, with a category of data that the first judging section has determined to represent a communication abnormality during a previous trip, and set a first category of data that has been determined to represent a communication abnormality during each of n trips, wherein n≥2, or a second category of data for which a frequency of having been determined to represent a communication abnormality during the n trips is greater than or equal to a predetermined value, to be a suppression target for which determination thereof as representing a communication abnormality by the first judging section is to be suppressed.

7 Claims, 10 Drawing Sheets

(56) References Cited

U.S. PATENT DOCUMENTS

2019/0173912 A1\* 6/2019 Ujiie ................. H04L 12/40026
2020/0053112 A1\* 2/2020 Torisaki ................. H04L 67/12

\* cited by examiner

FIG.5

| CAN ID | RECORDING MASK FLAG | | |
|---|---|---|---|
| | ID | DLC | PERIOD |
| 0x100 | INVALID | INVALID | INVALID |
| 0x200 | INVALID | INVALID | VALID |
| 0x250 | VALID | INVALID | INVALID |
| ... | ... | ... | ... |

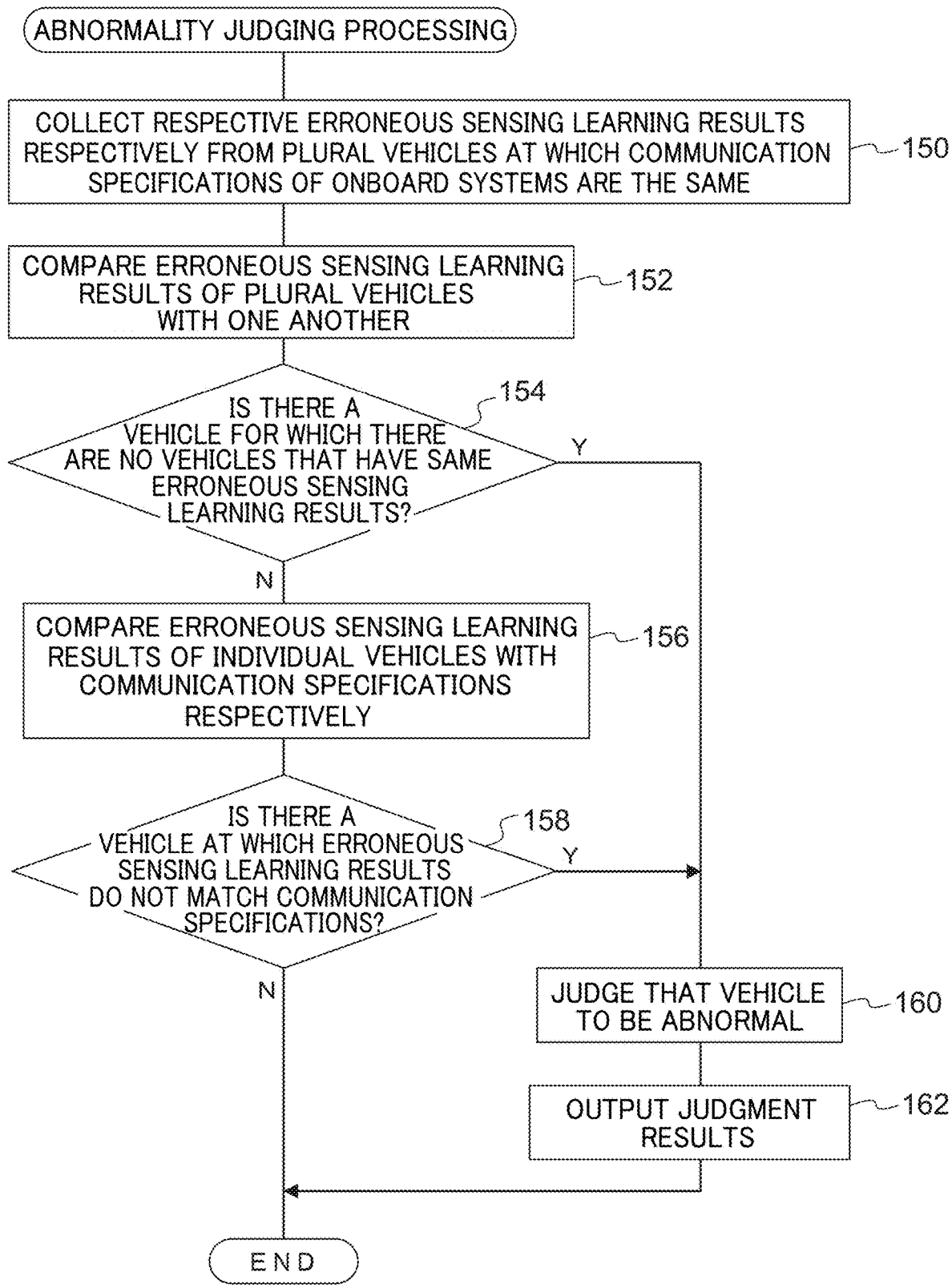

FIG.7

ERRONEOUS SENSING LEARNING RESULTS A

| CAN ID | RECORDING MASK FLAG | | |
|---|---|---|---|
| | ID | DLC | PERIOD |
| 0x100 | INVALID | INVALID | INVALID |
| 0x200 | INVALID | INVALID | VALID |
| 0x250 | VALID | INVALID | INVALID |
| ... | | | |

⇕ COMPARE

ERRONEOUS SENSING LEARNING RESULTS B

| CAN ID | RECORDING MASK FLAG | | |
|---|---|---|---|
| | ID | DLC | PERIOD |
| 0x100 | INVALID | INVALID | VALID |
| 0x200 | INVALID | INVALID | VALID |
| 0x250 | VALID | INVALID | INVALID |
| ... | | | |

PORTION THAT DIFFERS FROM ERRONEOUS SENSING LEARNING RESULTS OF OTHER VEHICLES

⇕ COMPARE

ERRONEOUS SENSING LEARNING RESULTS C

| CAN ID | RECORDING MASK FLAG | | |
|---|---|---|---|
| | ID | DLC | PERIOD |
| 0x100 | INVALID | INVALID | INVALID |
| 0x200 | INVALID | INVALID | VALID |
| 0x250 | VALID | INVALID | INVALID |
| ... | | | |

FIG.9

| CAN ID | RECORDING MASK FLAG | | | |
|---|---|---|---|---|
| | BUS | ID | DLC | PERIOD |
| 0x100 | BUS 1 | INVALID | INVALID | INVALID |
| | ... | ... | ... | ... |
| | BUS N | INVALID | INVALID | INVALID |
| 0x200 | BUS 1 | INVALID | INVALID | VALID |
| | ... | ... | ... | ... |
| ... | ... | ... | ... | ... |

FIG.10

| CAN ID | RECORDING MASK FLAG |
|--------|---------------------|
| 0x100  | INVALID             |
| 0x200  | INVALID             |
| 0x250  | VALID               |
| ...    | ...                 |

COMMUNICATION DEVICE, ABNORMALITY DETERMINATION DEVICE, METHOD, AND STORAGE MEDIUM

CROSS-REFERENCE TO RELATED APPLICATION

This application is based on and claims priority under 35 USC 119 from Japanese Patent Application No. 2019-199374 filed on Oct. 31, 2019, the disclosure of which is incorporated by reference herein.

BACKGROUND

Technical Field

The present disclosure relates to a communication device, an abnormality determination device, a method of operating communication device, an abnormality determination method, and storage mediums storing programs for operating communication device and abnormality determination.

Related Art

Japanese Patent Application Laid-Open (JP-A) No. 2014-146868 discloses a technique that, in a case in which first data that has a same identifier as received data that is used as a reference and whose reception interval is shorter than a predetermined period, is received, waits until the predetermined period has elapsed from the time of reception of the received data that is used as the reference, for reception of data that has the same identifier as the first data. In this technique, when second data that has the same identifier as the first data is received during the time of waiting for reception, it is judged that fraud (a spoofing attack or the like) has occurred and processing in cases of period abnormality detection is carried out.

In a technique of determining communication abnormalities such as in the technique of JP-A No. 2014-146868, if sensing rules, which are the standards for judging or determining whether or not there are communication abnormalities, are not set in advance so as to match the communication specifications of the onboard system prescribed for each vehicle, erroneous determination of communication abnormalities will arise. However, if sensing rules are created for each of respective vehicles at which the communication specifications of the onboard systems differ, the costs involved in creating the sensing rules increase.

SUMMARY

The present disclosure has been made in consideration of the above-described circumstances, and is to provide a communication device, an abnormality determination device, methods and storage mediums storing programs that have improved abnormality sensing accuracy, without creating sensing (detection) rules for each of respective vehicles at which the communication specifications of the onboard systems are different.

A first aspect of the present disclosure is a communication device having: a first judging section that performs, on received data, a communication abnormality determination based on detection rules; and a setting section that compares a category of data, which the first judging section has determined to represent a communication abnormality during a current trip, with a category of data that the first judging section has determined to represent a communication abnormality during a previous trip, and set a first category of data that has been determined to represent a communication abnormality during each of n trips, wherein n≥2, or a second category of data for which a frequency of having been determined to represent a communication abnormality during the n trips is greater than or equal to a predetermined value, to be a suppression target for which determination thereof as representing a communication abnormality by the first judging section is to be suppressed.

In the first aspect, a determination as to a communication abnormality is made on received data on the basis of the detection rules. Here, in a case in which the detection rules have a portion that does not match the communication specifications of the onboard system, data of a category corresponding to that portion will repeatedly be determined as being a communication abnormality. To address this, in the disclosure of the first aspect, a category of data, which is repeatedly determined to be a communication abnormality in n trips is set to be an object of suppression (i.e., suppression target) for which determination thereof as a communication abnormality is to be suppressed.

Due thereto, it is learned that the category of data, which corresponds to the portion of the detection rules that does not match the communication specifications of the onboard system, is a suppression target, and the accuracy of sensing abnormalities may be improved without creating detection rules for each of plural vehicles at which the communication specifications of the onboard systems are different. Further, because detection rules of vehicles, at which the communication specifications of the onboard systems differ, may be shared, the costs needed for creating the detection rules may be reduced.

In the first aspect, the setting section may be configured to not set, as the suppression target, a third category of data that has not been determined to represent a communication abnormality during at least one trip among the n trips, or a fourth category of data for which the frequency of having been determined to represent a communication abnormality during the n trips is less than a predetermined value.

In the above-described structure, a category of data, which has a low frequency of being determined to be a communication abnormality in n trips, is not set as a suppression target. Therefore, a communication abnormality, which is due to a spoofing attack or the like, being set as a suppression target may be avoided.

The first aspect may be structured such that, the setting section set a flag to "valid" for the first category of data that has been determined to represent a communication abnormality during each of the n trips, or the second category of data for which a frequency of having been determined to represent a communication abnormality during the n trips is greater than or equal to a predetermined value, the flag being used for suppressing determination of the data as representing a communication abnormality by the processor, and among data for which a communication abnormality has been detected based on the detection rules, the first judging section does not determine data of categories for which the flag has been set to valid to represent a communication abnormality.

In the above-described structure, the setting of a category of data, which is repeatedly determined to be a communication abnormality in n trips, as a suppression target for which determination thereof as a communication abnormality is to be suppressed, may be realized by the simple processing of setting a flag that is for suppressing the determination thereof as a communication abnormality.

The first aspect may be structured such that the data includes a CAN communication frame, and the first judging section detects, based on the detection rules, at least one of an abnormality of an ID, an abnormality of a DLC, or an abnormality of a transmission period of the frame, as the communication abnormality.

In CAN communication, there are often cases in which a communication abnormality that is due to a spoofing attack or the like manifests as any of an abnormality of the ID, an abnormality of the DLC, or an abnormality of the transmission period of the CAN communication frame. In the above-described structure, because at least one of the above-described respective abnormalities is detected as a communication abnormality, communication abnormalities that are due to spoofing attacks and the like may be detected.

In the first aspect, the detection rules may be shared by plural types of vehicles for which communication specifications of onboard systems are not the same.

In the above-described structure, because the detection rules are shared by plural types of vehicles at which communication specifications of onboard systems are not the same, costs such as those required in creating determination rules may be reduced.

A second aspect of the present disclosure is an abnormality determination device having: an acquiring section that acquires categories of data that have been set as suppression targets, from plural vehicles at each of which the communication device of the first aspect is installed and for which communication specifications of onboard systems are the same; and a second judging section that compares the acquired categories of data that have been set as the suppression targets with one another, and determine a vehicle for which there are no vehicles having the same category of data that has been set as the suppression target, or a vehicle for which there are relatively few vehicles having the same category of data that has been set as the suppression target, to be abnormal.

In the second aspect, categories of data that have been set as objects of suppression (i.e., suppression target) are acquired respectively from plural vehicles at which the communication specifications of the onboard systems are the same. Here, at the plural vehicles, the communication specifications of the onboard systems are the same. Therefore, in principle, at a vehicle at which the category of data that is set as a suppression target is the same but that has been subjected to a spoofing attack or the like, the category of the data that is set as a suppression target may be different from other vehicles.

In the second aspect, by using this, the categories of data, which have been set as suppression targets and have been acquired respectively from plural vehicles, are compared with one another. A vehicle, for which there are no vehicles having the same category of data that has been set as a suppression target, or a vehicle, for which there are few vehicles having the same category of data that has been set as a suppression target, is determined to be abnormal. Due thereto, the accuracy of detecting abnormalities that are due to spoofing attacks or the like may be improved, without creating detection rules for each of respective vehicles at which the communication specifications of the onboard systems differ.

In the second aspect, the second judging section may compare the category of data that has been set as the suppression target with the communication specifications, and may further determine that a vehicle, at which the category of the data that has been set as the suppression target does not match the communication specifications, is abnormal.

In a vehicle that has been subjected to a spoofing attack or the like, there are cases in which a category of data that does not match the communication specifications is included among the categories of data that have been set as suppression targets. In the above-described structure, a vehicle at which the category of the data that has been set as a suppression target does not match the communication specifications, is also determined to be abnormal. Therefore, the accuracy of detecting abnormalities that are due to spoofing attacks or the like may be further improved.

A third aspect of the present disclosure is a method of operating an onboard communication device, the method including: performing, on received data, a communication abnormality determination based on detection rules; and comparing a category of data, which has been determined by the determination to represent a communication abnormality during a current trip, with a category of data that has been determined to represent a communication abnormality in a previous trip, and setting a first category of data that has been determined to represent a communication abnormality during each of n trips, wherein n≥2, or a second category of data for which a frequency of having been determined to represent a communication abnormality during the n trips is greater than or equal to a predetermined value, to be a suppression target for which determination thereof as representing a communication abnormality is to be suppressed.

A fourth aspect of the present disclosure is an abnormality determination method, including: acquiring categories of data, which have been set as suppression targets by the method of operating an onboard communication device of the third aspect, from each of plural vehicles for which communication specifications of onboard systems are the same and at which the onboard communication devices are installed; and comparing the acquired categories of data that have been set as the suppression targets with one another, and determining a vehicle for which there are no vehicles having the same category of data that has been set as the suppression target, or a vehicle for which there are relatively few vehicles having the same category of data that has been set as the suppression target, to be abnormal.

A fifth aspect of the present disclosure is a non-transitory storage medium that stores a program executable by a computer to perform communication processing, the communication processing including: performing, on received data, a communication abnormality determination based on detection rules; and comparing a category of data, which has been determined by the determination to represent a communication abnormality during a current trip, with a category of data that has been determined to represent a communication abnormality during a previous trip, and setting a first category of data that has been determined to represent a communication abnormality during each of n trips, wherein n≥2, or a second category of data for which a frequency of having been determined to represent a communication abnormality during the n trips is greater than or equal to a predetermined value, to be a suppression target for which determination thereof as representing a communication abnormality is to be suppressed.

A sixth aspect of the present disclosure is a non-transitory storage medium that stores a program executable by a computer to perform abnormality determination processing, the abnormality determination processing including: acquiring categories of data, which have been set as suppression targets by the communication processing of the fifth aspect, from each of plural vehicles for which communication specifications of onboard systems are the same; and comparing the acquired categories of data that have been set as the suppression targets with one another, and determining a vehicle for which there are no vehicles having the same category of data that has been set as the suppression target, or a vehicle for which there are relatively few vehicles having the same category of data that has been set as the suppression target, to be abnormal.

The present disclosure may improve the accuracy of detecting abnormalities, without creating detection rules for each of respective vehicles at which the communication specifications of the onboard systems are different.

BRIEF DESCRIPTION OF DRAWINGS

FIG. 5 is a table illustrating an example of erroneous sensing learning results.

FIG. 6 is a flowchart illustrating abnormality judging processing that is executed by the abnormality judging server.

FIG. 7 is a schematic drawing for explaining the processing of judging an abnormality from erroneous sensing learning results of plural vehicles.

FIG. 9 is a table illustrating another example of erroneous sensing learning results.

FIG. 10 is table illustrating yet another example of erroneous sensing learning results.

DETAILED DESCRIPTION

Figure 1:
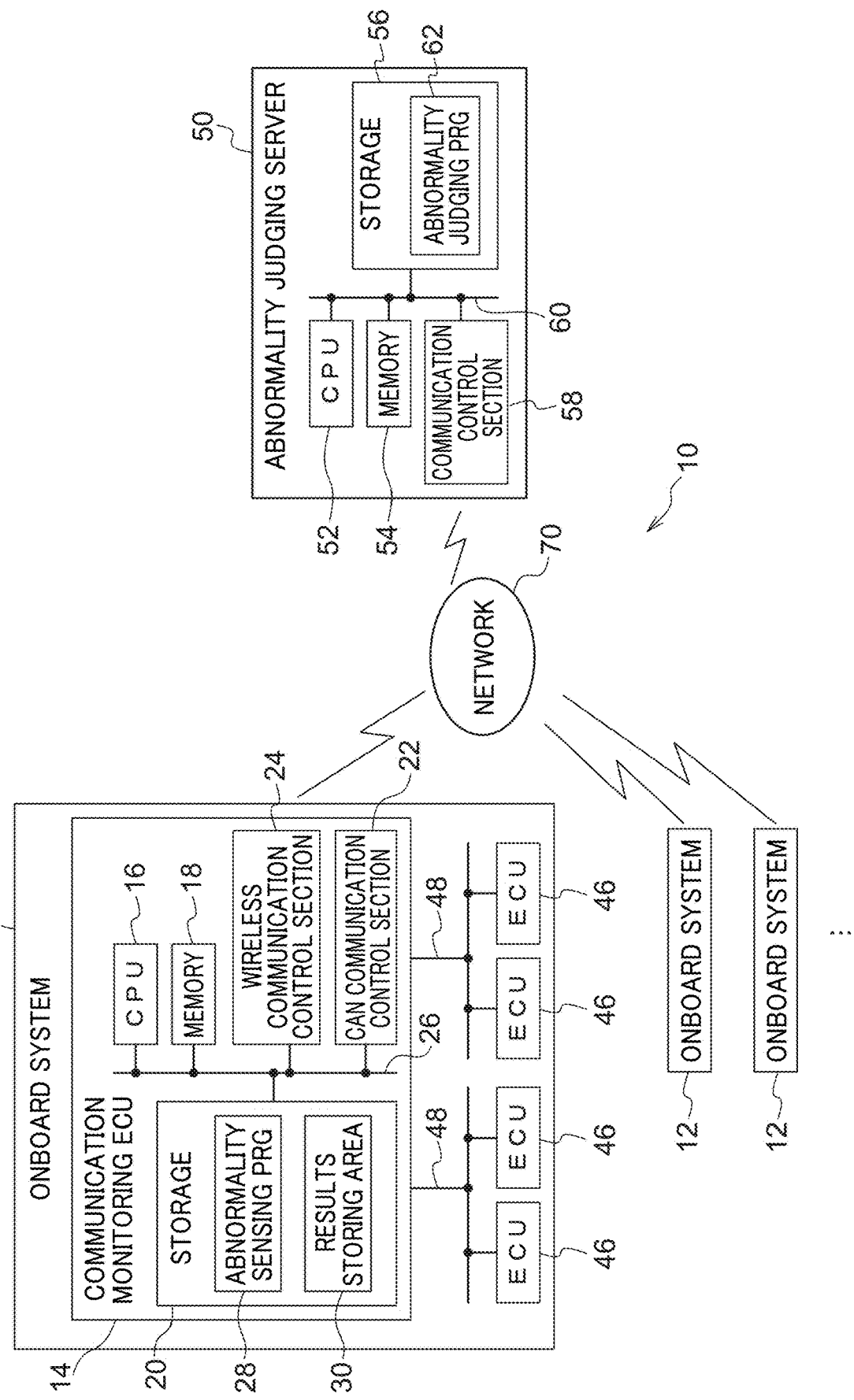
FIG. 1 is a block drawing illustrating the schematic structure of an abnormality determination system relating to an embodiment.
Figure 2:
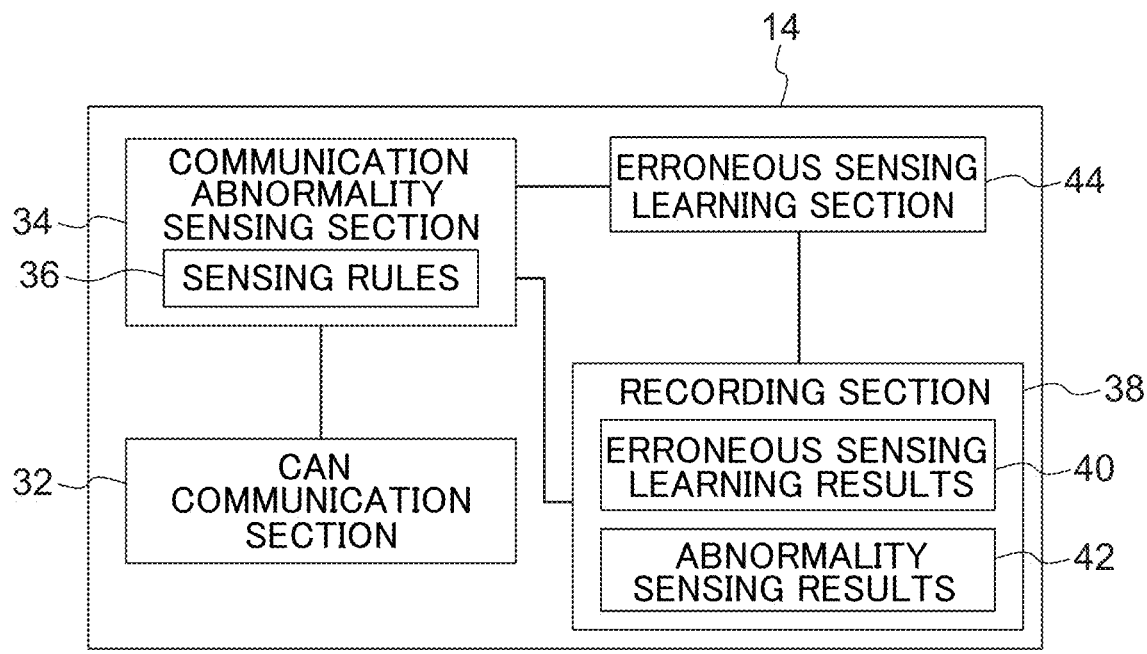
FIG. 2 is a functional block drawing of a communication monitoring ECU.

An example of an embodiment of the present disclosure is described in detail hereinafter with reference to the drawings. As illustrated in FIG. 1, an abnormality determination system 10 relating to the embodiment includes plural onboard systems 12 that are installed in plural different vehicles, and an abnormality judging server 50. The plural onboard systems 12 and the abnormality judging server 50 may communicate with one another through a network 70.

The onboard system 12 includes one communication monitoring ECU (Electronic Control Unit) 14, and plural ECUs 46 that have functions that differ from one another. The plural ECUs 46 are respectively connected to the communication monitoring ECU 14 via a CAN (Controller Area Network) communication bus 48. CAN communication which is compliant with the communication specifications of the onboard system 12 is carried out between the communication monitoring ECU 14 and the ECUs 46. Note that, although four of the ECUs 46 are illustrated in FIG. 1, the number of the ECUs 46 that are included in the onboard system 12 is not limited to this.

The communication monitoring ECU 14 includes a Central Processing Unit (CPU) 16, a memory 18 such as a Read Only Memory (ROM) or a Random Access Memory (RAM) or the like, a non-volatile storage 20 such as a Hard Disk Drive (HDD) or a Solid State Drive (SSD) or the like, a CAN communication control section 22, and a wireless communication control section 24. The CPU 16, the memory 18, the storage 20, the CAN communication control section 22 and the wireless communication control section 24 are connected so as to be able to communicate with one another via an internal bus 26.

An abnormality sensing program 28 is stored in the storage 20, and a results storing area 30 is provided in the storage 20. The communication monitoring ECU 14 functions as a CAN communication section 32, a communication abnormality sensing section 34, an erroneous sensing learning section 44 and a recording section 38 due to the abnormality sensing program 28 being read-out from the storage 20 and loaded on the memory 18, and the abnormality sensing program 28 that is loaded on the memory 18 being executed by the CPU 16. Due thereto, the communication monitoring ECU 14 functions as an example of the communication device.

In cooperation with the CAN communication control section 22, the CAN communication section 32 receives a CAN communication frame from the CAN communication bus 48. On the basis of sensing (detection) rules 36 determined in advance on the basis of the communication specifications of the onboard system 12, the communication abnormality sensing section 34 carries out communication abnormality determination on the CAN communication frame that the CAN communication section 32 receives. In the present embodiment, there are the following three types of communication abnormalities that the communication abnormality sensing section 34 senses.

(1) Fraudulent ID Judgment: With respect to a CAN communication frame whose ID is not defined in the sensing rules 36, the communication abnormality sensing section 34 determines that there is a communication abnormality due to fraud such as a spoofing attack or the like.

(2) Fraudulent DLC Judgement: With respect to a CAN communication frame whose DLC is not defined in the sensing rules 36, the communication abnormality sensing section 34 determines that there is a communication abnormality due to fraud such as a spoofing attack or the like.

(3) Fraudulent Period Judgment: With respect to a CAN communication frame of a transmission period that differs from the sensing rules 36, the communication abnormality sensing section 34 determines that there is a communication abnormality due to fraud such as a spoofing attack or the like.

Note that, in the present embodiment, vehicles at which the communication specifications of the onboard systems 12 are not the same are included among the plural vehicles in which the onboard systems 12 are installed. The sensing rules 36 are rules that are shared in common by plural types of vehicles at which the communication specifications of the onboard systems are not the same.

The erroneous sensing learning section 44 carries out judgment on the results, which have been determined to be a communication abnormality by the communication abnormality sensing section 34, as to whether or not there has been erroneous sensing. Specifically, the erroneous sensing learning section 44 compares the category of data, which has been determined to be a communication abnormality by the communication abnormality sensing section 34 in the current trip, and the category of data, which has been determined to be a communication abnormality by the communication abnormality sensing section 34 in the previous trip, and sets the category of data, which has been determined to be a communication abnormality in the current trip and the previous trip respectively, as an object of suppression (i.e., suppression target) for which judgment as a communication abnormality by the communication abnormality sensing section 34 is to be suppressed, as erroneous sensing learning results 40.

The recording section 38 records, in the results storing area 30, the results of sensing by the erroneous sensing learning section 44 (i.e., abnormality sensing results 42 of the previous trip) and the results of learning by the erroneous sensing learning section 44 (i.e., the erroneous sensing learning results 40). Note that the communication abnormality sensing section 34 is an example of the first judging section, and the erroneous sensing learning section 44 is an example of the setting section.

The abnormality judging server 50 includes a CPU 52, a memory 54 such as a ROM or a RAM or the like, a non-volatile storage 56 such as an HDD or an SSD or the like, and a communication control section 58. The CPU 52, the memory 54, the storage 56 and the communication control section 58 are connected so as to be able to communicate with one another via an internal bus 60.

Figure 3:
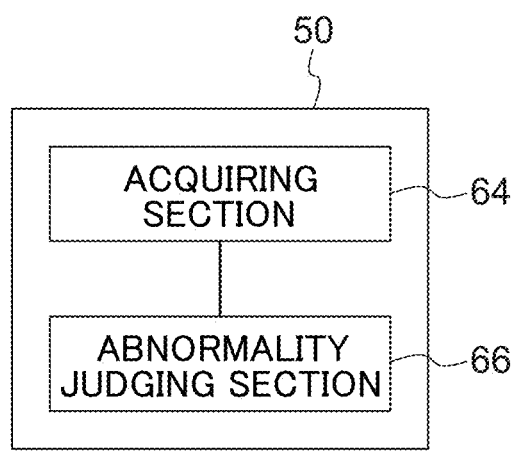
FIG. 3 is a functional block drawing of an abnormality judging server.
Figure 4:
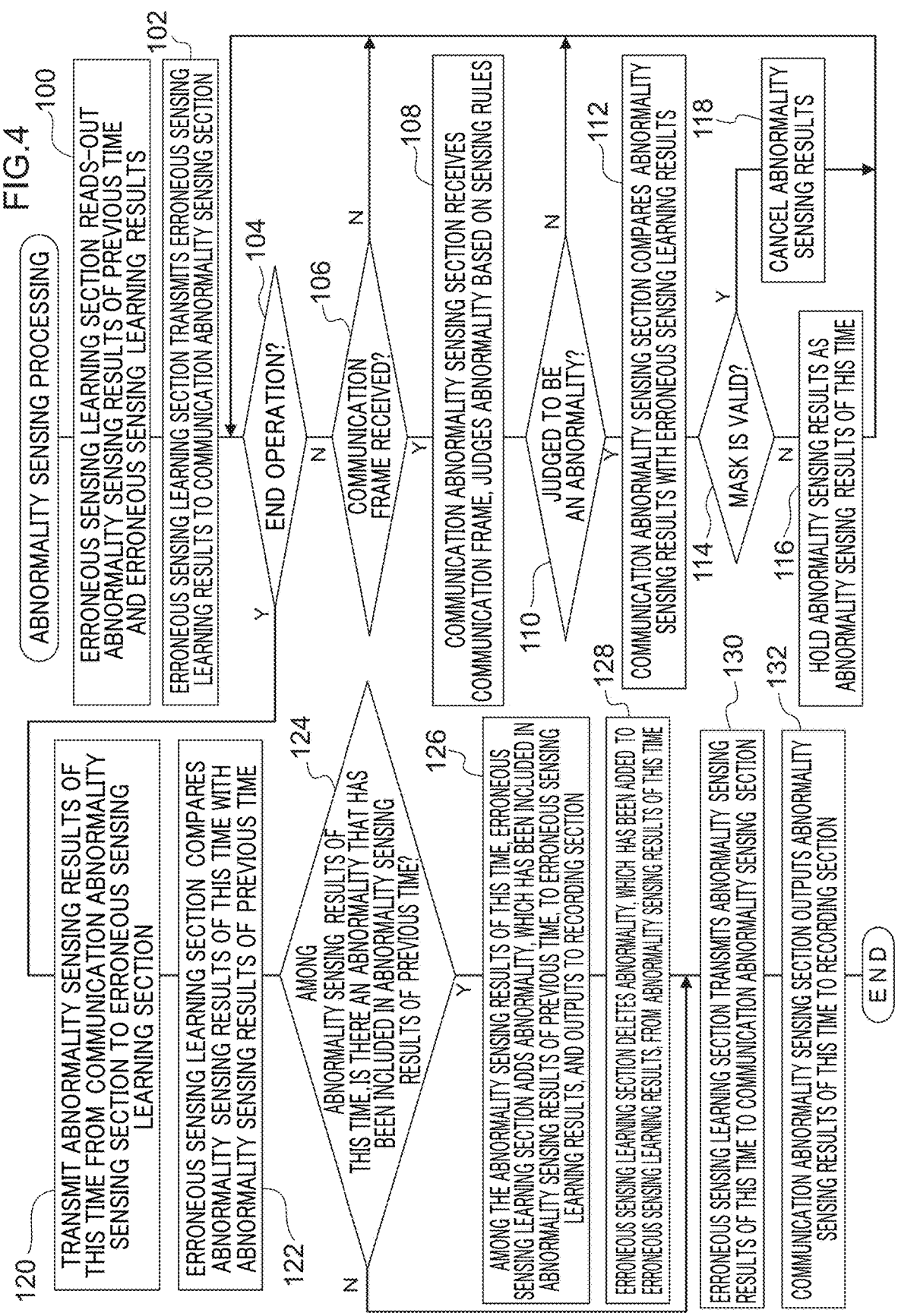
FIG. 4 is a flowchart illustrating abnormality sensing processing that is executed by the communication monitoring ECU.

An abnormality judging program 62 is stored in the storage 56. The abnormality judging server 50 functions as an acquiring section 64 and an abnormality judging section 66 that are illustrated in FIG. 3, due to the abnormality judging program 62 being read-out from the storage 56 and loaded on the memory 54, and the abnormality judging program 62 loaded on the memory 54 being executed by the CPU 52. Due thereto, the abnormality judging server 50 functions as an example of the abnormality judging device.

The acquiring section 64 acquires the respective categories of data (the erroneous sensing learning results 40) which have been set as objects of suppression, from the onboard systems 12 of plural vehicles at which the communication specifications of the onboard systems 12 are the same. The abnormality judging section 66 compares the categories of data (i.e., the erroneous sensing learning results 40), which have been acquired from the plural vehicles respectively and have been set as objects of suppression, with one another, and determines that a vehicle, for which there are no vehicles that have the same category of data that has been set as an object of suppression, is abnormal. Note that the acquiring section 64 is an example of the acquiring section, and the abnormality judging section 66 is an example of the second judging section.

Next, the abnormality sensing processing that is executed by the communication monitoring CPU 14 at the time when, for example, the ignition switch of the vehicle is turned on, or the like, is described as operation of the present embodiment with reference to FIG. 3.

In step 100 of the abnormality sensing processing, the erroneous sensing learning section 44 reads-out, from the recording section 38, the abnormality sensing results 42 of the previous trip and the erroneous sensing learning results 40 that are recorded in the recording section 38. In step 102, the erroneous sensing learning section 44 transmits, to the communication abnormality sensing section 34, the erroneous sensing learning results 40 that have been read-out from the recording section 38 in step 100.

In step 104, with, for example, the ignition switch of the vehicle being turned off being the trigger therefor, the CAN communication section 32 determines whether or not to end operation. If the judgment in step 104 is negative, the routine moves on to step 106. In step 106, the CAN communication section 32 determines whether or not a CAN communication frame has been received from the ECU 46. If the determination in step 106 is negative, the routine returns to step 104, and steps 104 and 106 are repeated until the determination of step 104 or step 106 becomes affirmative.

In a case in which the CAN communication section 32 receives a CAN communication frame from the ECU 46, the determination in step 106 is affirmative, and the routine moves on to step 108. In step 108, the communication abnormality sensing section 34 receives, from the CAN communication section 32, the CAN communication frame that has been received by the CAN communication section 32, and, on the basis of the sensing rules 36, determines the absence/presence of a communication abnormality (fraudulent ID judgement/fraudulent DLC judgment/fraudulent period judgment).

In step 110, the communication abnormality sensing section 34 determines whether or not it has been determined in step 108 that there is a communication abnormality. If the received CAN communication frame does not correspond to any of a fraudulent ID judgement, a fraudulent DLC judgment or a fraudulent period judgment, the determination in step 110 is negative, and the routine returns to step 104.

On the other hand, if the received CAN communication frame corresponds to at least one of a fraudulent ID judgement, a fraudulent DLC judgment or a fraudulent period judgment, the determination in step 110 is affirmative, and the routine moves on to step 112. In step 112, the communication abnormality sensing section 34 compares the abnormality sensing results of this time with the erroneous sensing learning results 40.

As illustrated as an example in FIG. 5, a flag expressing whether a mask for the determination on communication abnormality is valid (=mask applied) or invalid (=no mask applied) may be set for each of the categories of ID, DLC and period, for the CAN IDs in the erroneous sensing learning results 40 relating to the present embodiment. In the present embodiment, the initial values of the masks (flags) are all made to be "invalid", and, in a case in which it is determined that erroneous sensing of a communication abnormality has arisen, the corresponding CAN ID and the mask (flag) of the category is changed and set to "valid".

In step 114, on the basis of the results of comparison in step 112, the communication abnormality sensing section 34 determines whether or not the mask (flag), which corresponds to the CAN ID and the category (ID/DLC/period) of the data determined to be a communication abnormality, is set to "valid". If the determination in step 114 is negative, the routine moves on to step 116. In step 116, the communication abnormality sensing section 34 holds the abnormality sensing results of this time as the abnormality sensing results of the current trip. However, if the determination in step 114 is affirmative, the routine moves on to step 118, and, in step 118, the communication abnormality sensing section 34 cancels the abnormality sensing results of this time.

Further, if the determination of step 104 is affirmative, the routine moves on to step 120. In step 120, the communication abnormality sensing section 34 transmits the abnormality sensing results of the current trip to the erroneous sensing learning section 44. In step 122, the erroneous sensing learning section 44 compares the abnormality sensing results 42 of the previous trip and the abnormality sensing results of the current trip. In step 124, on the basis of the comparison of the abnormality sensing results in step 122, the erroneous sensing learning section 44 determines whether or not there exists, within the abnormality sensing results of the current trip, an abnormality that has been included in the abnormality sensing results of the previous trip.

If the determination in step 124 is negative, the routine moves on to step 130. On the other hand, in the present embodiment, because the sensing rules 36 are rules that are shared by plural types of vehicles at which the communication specifications of the onboard systems are not the same, there is the possibility that the sensing rules 36 have a portion that does not match the communication specifications of the onboard system. Further, if the sensing rules 36 have a portion that does not match the communication specifications of the onboard system, due to data of the category that corresponds to that portion being repeatedly determined to be a communication abnormality (i.e., due to that data being determined to be communication abnormality in the previous trip and in the current trip respectively), the determination of step 124 becomes affirmative.

If the determination in step 124 is affirmative, the routine moves on to step 126. In step 126, the erroneous sensing learning section 44 adds, to the erroneous sensing learning results 40, the abnormality, which is included in the abnormality sensing results 42 of the previous trip, among the abnormality sensing results of the current trip (i.e., sets the mask (flag) of the corresponding data category to "valid"). Then, the erroneous sensing learning section 44 outputs the erroneous sensing learning results 40 to the recording section 38, and the recording section 38 records the erroneous sensing learning results 40 in the results storing area 30. Further, in step 128, the erroneous sensing learning section 44 deletes, from the abnormality sensing results of the current trip, the abnormality that has been added to the erroneous sensing learning results 40 from the abnormality sensing results of the current trip.

In step 130, the erroneous sensing learning section 44 transmits the abnormality sensing results of the current trip to the communication abnormality sensing section 34. Then, in step 132, the communication abnormality sensing section 34 outputs the abnormality sensing results of the current trip to the recording section 38, and the recording section 38 records, in the results storing area 30 and as the abnormality sensing results 42, the abnormality sensing results of the current trip that have been inputted from the communication abnormality sensing section 34.

The abnormality judging processing, which is executed periodically by the abnormality judging server 50 at a time such as once a week or the like for example, is described next with reference to FIG. 6.

In step 150 of the abnormality judging processing, the acquiring section 64 collects the respective erroneous sensing learning results 40 through the network 70 from the onboard systems 12 of plural vehicles at which the communication specifications of the onboard systems are the same. In step 152, the abnormality judging section 66 compares the erroneous sensing learning results 40, which have been respectively collected from the plural vehicles in step 150, with one another. Then, in step 154, on the basis of the results of comparing the erroneous sensing learning results 40 with one another in step 152, the abnormality judging section 66 determines whether or not there is a vehicle for which there are no vehicles that have the same erroneous sensing learning results 40.

FIG. 7 illustrates an example in which, as a result of collecting erroneous sensing learning results A through C from vehicles A through C and comparing them with one another, in the erroneous sensing learning results B from vehicle B, the portion (the portion surrounded by the dashed line in FIG. 7) at which the mask (flag) of the "period" at CAN ID=0x100 is "valid" is different from the erroneous sensing learning results A, C from the other vehicles A, C.

In this case, the determination in step 154 is affirmative, and the routine moves on to step 160.

In step 160, the abnormality judging section 66 determines a vehicle, for which there are no vehicles that have the same erroneous sensing learning results 40, to be a vehicle that has been subjected to a spoofing attack or the like and at which an abnormality has arisen. Then, in step 162, the abnormality judging section 66 carries out abnormality outputting processing that notifies the vehicle for which it has been determined that an abnormality has occurred thereat, and ends the abnormality judging processing. Note that examples of the abnormality outputting processing include, for example, processing that displays, on a display portion that is provided at the abnormality judging server 50, the vehicle for which it has been determined that an abnormality has arisen, or processing that notifies the onboard system 12 of the vehicle, for which it has been determined that an abnormality has arisen, that an abnormality has arisen, or the like.

Further, if the determination in step 154 is negative, the routine moves on to step 156. In step 156, the abnormality judging section 66 compares the erroneous sensing learning results 40 of the individual vehicles with the communication specifications, respectively. Then, in step 158, the abnormality judging section 66 determines whether or not there is a vehicle at which the erroneous sensing learning results 40 do not match the communication specifications.

Figure 8:
FIG. 8 is a schematic drawing for explaining the processing of judging an abnormality by comparing erroneous sensing learning results with communication specifications.

FIG. 8 illustrates an example in which, as a result of comparing the erroneous sensing learning results of a given vehicle with the communication specifications, there exists, in the erroneous sensing learning results, a row (the portion surrounded by the dotted line in FIG. 8) of masks (flags) of the CAN ID=0x220 that are not prescribed in the communication specifications. In this case, the determination in step 158 is affirmative, and the routine moves on to step 160. Then, the vehicle, at which the erroneous sensing learning results 40 do not match the communication specifications, is determined (at step 160) to be a vehicle that has been subjected to a spoofing attack or the like and at which an abnormality has arisen, and abnormality outputting processing is carried out (at step 162). Note that, if the determination of step 158 is negative, the abnormality judging processing is ended.

As described above, in the present embodiment, a communication abnormality judgment is carried out, on the basis of the sensing rules 36, on the data (i.e., the CAN communication frame) that the CAN communication section 32 receives. The erroneous sensing learning section 44 compares the category of the data, which is determined by the communication abnormality sensing section 34 to be a communication abnormality in the current trip, with the category of the data that has been determined by the communication abnormality sensing section 34 to be a communication abnormality in the previous trip. Then, the erroneous sensing learning section 44 sets the category of the data, which has been determined to be an abnormality in each of the two trips (n=2) that are the current trip and the previous trip, to be an object of suppression for which determination as a communication abnormality by the communication abnormality sensing section 34 is to be suppressed. Due thereto, the accuracy of sensing abnormalities may be improved without preparing the sensing rules 36 for each of respective vehicles at which the communication specifications of the onboard systems 12 differ. Further, because the sensing rules 36 of vehicles at which the communication specifications of the onboard systems 12 are different may be shared, costs involved in creating sensing rules, and the like, may be reduced.

Further, in the present embodiment, the erroneous sensing learning section 44 does not set a category of data, which has not been determined to be a communication abnormality in at least one trip among the two trips (n=2) that are the current trip and the previous trip, to be an object of suppression. Due thereto, a communication abnormality that is caused by a spoofing attack or the like being set as an object of suppression may be avoided.

Further, in the present embodiment, the erroneous sensing learning section 44 sets the flag, which is for suppressing determination as a communication abnormality by the communication abnormality sensing section 34, to be valid for a category of data that has been determined to be a communication abnormality in each of the two trips (n=2) that are the current trip and the previous trip. Further, among the data at which a communication abnormality has been sensed on the basis of the sensing rules 36, the communication abnormality sensing section 34 does not determine that data of a category whose flag is set to valid is a communication abnormality. Due thereto, setting a category of data, which has been determined to be a communication abnormality in each of two trips, to be an object of suppression for which determination as a communication abnormality is to be suppressed, may be realized by simple processing of setting a flag for suppressing determination thereof as a communication abnormality.

Moreover, in the present embodiment, the data that is received is a frame of CAN communication, and, on the basis of the sensing rules 36, the communication abnormality sensing section 34 senses at least one communication abnormality among an abnormality of the ID, an abnormality of the DLC, and an abnormality in the transmitted period of the frame of the CAN communication. Due thereto, it is possible to sense communication abnormalities that are caused by spoofing attacks or the like.

Further, in the present embodiment, the sensing rules 36 are made to be rules that are shared by plural types of vehicles at which the communication specifications of the onboard systems 12 are not the same. Due thereto, it is possible to reduce costs needed in creating sensing rules, and the like.

Further, in the present embodiment, the acquiring section 64 acquires the respective categories of data that have been set as objects of suppression (the erroneous sensing learning results 40) from plural vehicles in which the communication monitoring ECUs 14 are respectively installed and at which the communication specifications of the onboard systems 12 are the same. The abnormality judging section 66 compares the erroneous sensing learning results 40, which are acquired from the plural vehicles respectively, with one another, and determines that a vehicle, for which there are no vehicles that have the same erroneous sensing learning results 40, is abnormal. Due thereto, it is possible to improve the accuracy of sensing an abnormality that is due to a spoofing attack or the like, without generating the sensing rules 36 for each of vehicles at which the communication specifications of the onboard systems 12 are different.

Note that, in the present embodiment, the abnormality judging section 66 compares the erroneous sensing learning results 40 with the communication specifications of the onboard system 12, and determines that a vehicle, at which the erroneous sensing learning results 40 do not match the communication specifications of the onboard system 12, also is abnormal. Due thereto, it is possible to further improve the accuracy of sensing an abnormality that is due to a spoofing attack or the like.

Note that the above describes a form in which a category of data, which has been determined to be a communication abnormality in each of the two trips (n=2) that are the current trip and the previous trip, is set as an object of suppression for which determination thereof as a communication abnormality by the communication abnormality sensing section 34 is to be suppressed. However, the present disclosure is not limited to this. For example, a category of data, which has been determined to be a communication abnormality in each of three or more trips (n≥3) including the current trip, may be set as an object of suppression for which determination thereof as a communication abnormality by the communication abnormality sensing section 34 is to be suppressed. Further, for example, a category of data, at which the frequency of being determined to be a communication abnormality in n trips is greater than or equal to a predetermined value, may be set to be an object of suppression for which determination thereof as a communication abnormality by the communication abnormality sensing section 34 is to be suppressed.

Further, in the above the structure illustrated in FIG. 5 is described as an example of the erroneous sensing learning results 40, but the present disclosure is not limited to this structure. For an example, in the erroneous sensing learning results that are illustrated in FIG. 9, a mask (flag) may be set for the CAN ID, the CAN communication bus, and each of the respective categories of the ID, the DLC, and the period. In the example illustrated in FIG. 9, in a case in which it is determination that erroneous sensing of a communication abnormality has arisen, the mask (flag) that corresponds to the CAN ID, the CAN communication bus and the category is changed and set to "valid". Further, for example, in the erroneous sensing learning results illustrated in FIG. 10, a mask (flag) may be set for each CAN ID, and, if it is determined that erroneous sensing of a communication abnormality has arisen, the mask (flag) that corresponds to the CAN ID may be changed and set to "valid". The erroneous sensing learning results 40 may be the structure illustrated in FIG. 9 or FIG. 10.

Further, the above describes an implementation in which an abnormality of the ID, an abnormality of the DLC, and an abnormality of the transmission interval of a CAN frame are respectively sensed as communication abnormalities, but the present disclosure is not limited to this. Alternatively, one or more abnormality selected from among an ID abnormality, a DLC abnormality, and a transmission interval abnormality may be sensed.

Further, the above describes an implementation in which, in the abnormality judging processing (FIG. 6), a vehicle, for which there are no vehicles that have the same erroneous sensing learning results 40, is determined to be a vehicle that has been subjected to a spoofing attack or the like and at which an abnormality has arisen. However, the present disclosure is not limited to this. A vehicle, at which the number of vehicles that have the same erroneous sensing learning results 40 is a low number, may be determined to be a vehicle that has been subjected to a spoofing attack or the like and at which an abnormality has arisen.

Further, although CAN communication is described as an example of the communication in the onboard system in the above, the present disclosure is not limited to CAN communication, and may also be applied to another known form of communication such as LIN, FlexRay or the like, for example.

What is claimed is:

1. A communication device comprising:
a memory; and
a processor coupled to the memory, the processor being configured to:
perform, on received data, a communication abnormality determination based on detection rules;
compare a data length code (DLC) of the received data, which the processor has determined to represent a communication abnormality during a current trip using the performed communication abnormality determination, with a DLC of data that the processor has determined to represent a communication abnormality using the performed communication abnormality determination during a previous trip;
compare a transmission period of a frame of the received data, which the processor has determined to represent the communication abnormality during the current trip, with a transmission period of a frame of the data that the processor has determined to represent the communication abnormality using the performed communication abnormality determination during the previous trip;
set a mask that suppresses determination of the received data as representing a communication abnormality for each of the DLC and the transmission period of a frame, for each controller area network identifications (CAN IDs) of communication frames;
when the mask is set for a DLC of data of a predetermined CAN ID, not perform the communication abnormality determination based on comparing respective DLCs on the data of the predetermined CAN ID; and
when the mask is set for a transmission period of a frame of data of a predetermined CAN ID, not perform the communication abnormality determination based on comparing respective transmission periods of frames on the data of the predetermined CAN ID.

2. The communication device of claim 1, wherein: the processor is further configured to set the mask to a first category of data that has been determined to represent a communication abnormality during each of n trips, wherein n>2, or a second category of data for which a frequency of having been determined to represent a communication abnormality during the n trips is greater than or equal to a predetermined value, and the first category of data and the second category of data are selected from a group of the ID, the DLC, and the transmission period of the frame.

3. The communication device of claim 2, wherein the processor is configured to not set, as a suppression target, a third category of data that has not been determined to represent a communication abnormality during at least one trip among the n trips, or a fourth category of data for which the frequency of having been determined to represent a communication abnormality during the n trips is less than a predetermined value.

4. The communication device of claim 2, wherein the processor is configured to: set a flag to "valid" for the first category of data that has been determined to represent a communication abnormality during each of the n trips, or the second category of data for which a frequency of having been determined to represent a communication abnormality during the n trips is greater than or equal to a predetermined value, the flag being used for suppressing determination of the data as representing a communication abnormality by the processor, and among data for which a communication abnormality has been detected based on the detection rules, not determine data of categories for which the flag has been set to valid to represent a communication abnormality.

5. The communication device of claim 1, wherein the detection rules are shared by a plurality of types of vehicles for which communication specifications of onboard systems are not the same.

6. A method of operating an onboard communication device, the method comprising:
performing, on received data, a communication abnormality determination based on detection rules;
comparing a data length code (DLC) of the received data, which has been determined by the determination to represent a communication abnormality during a current trip using the performed communication abnormality determination, with a DLC of data that has been determined to represent a communication abnormality using the performed communication abnormality determination in a previous trip;
comparing a transmission period of a frame of the received data, which the processor has determined to represent the communication abnormality during the current trip, with a transmission period of a frame of the data that the processor has determined to represent the communication abnormality using the performed communication abnormality determination during the previous trip;
setting a mask that suppresses determination of the received data as representing a communication abnormality for each of the DLC and the transmission period of a frame, for each controller area network identifications (CAN IDs) of communication frames;
when the mask is set for a DLC of data of a predetermined CAN ID, not performing the communication abnormality determination based on comparing respective DLCs on the data of the predetermined CAN ID: and when the mask is set for a transmission period of a frame of data of a predetermined CAN ID, not performing the communication abnormality determination based on comparing respective transmission periods of frames on the data of the predetermined CAN ID.

7. A non-transitory computer readable storage medium that stores a program executable by a computer to perform communication processing, the communication processing comprising:
performing, on received data, a communication abnormality determination based on detection rules; and
comparing a data length code (DLC) of the received data, which has been determined by the communication abnormality determination to represent a communication abnormality during a current trip using the performed communication abnormality determination, with a DLC of data that has been determined to represent a communication abnormality using the communication abnormality determination during a previous tip;
comparing a transmission period of a frame of the received data, which the processor has determined to represent the communication abnormality during the current trip, with a transmission period of a frame of the data that the processor has determined to represent the communication abnormality using the performed communication abnormality determination during the previous trip;
setting a mask that suppresses determination of the received data as representing a communication abnormality for each of the DLC and the transmission period of a frame, for each controller area network identifications (CAN IDs) of communication frames;

when the mask is set for a DLC of data of a predetermined CAN ID, not performing the communication abnormality determination based on comparing respective DLCs on the data of the predetermined CAN ID; and when the mask is set for a transmission period of a frame of data of a predetermined CAN ID, not performing the communication abnormality determination based on comparing respective transmission periods of frames on the data of the predetermined CAN ID.

\* \* \* \* \*